United States Patent
Totale et al.

(10) Patent No.: US 9,678,856 B2
(45) Date of Patent: Jun. 13, 2017

(54) ANNOTATED TEST INTERFACES

(71) Applicant: EMC Corporation, Hopkinton, MA (US)

(72) Inventors: Sachin Gopaldas Totale, Bangalore (IN); Samir Yasin Vaidya, Bangalore (IN); Swati Bhatia, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 16 days.

(21) Appl. No.: 14/755,842

(22) Filed: Jun. 30, 2015

(65) Prior Publication Data
US 2016/0321165 A1    Nov. 3, 2016

(30) Foreign Application Priority Data
Apr. 30, 2015  (IN) .......................... 2216/CHE/2015

(51) Int. Cl.
  G06F 9/44    (2006.01)
  G06F 11/36   (2006.01)
(52) U.S. Cl.
  CPC ...... *G06F 11/3664* (2013.01); *G06F 11/3688* (2013.01)
(58) Field of Classification Search
  CPC .................... G06F 11/3664; G06F 11/3688
  USPC ......................................................... 717/124
  See application file for complete search history.

(56) References Cited

U.S. PATENT DOCUMENTS

| | | | | |
|---|---|---|---|---|
| 5,600,789 A * | 2/1997 | Parker | .............. | G06F 11/3688 714/38.11 |
| 5,634,002 A * | 5/1997 | Polk | .............. | G06F 11/3688 714/38.14 |
| 6,047,389 A * | 4/2000 | Thai | .............. | G06F 11/3656 714/38.12 |
| 6,502,102 B1 * | 12/2002 | Haswell | .............. | G06F 11/3664 |
| 8,689,189 B1 * | 4/2014 | Cansizlar | .............. | G06F 11/3672 717/124 |
| 9,141,379 B2 * | 9/2015 | Boden | .............. | G06F 11/3676 |
| 2003/0041288 A1 * | 2/2003 | Kolawa | .............. | G06F 11/3664 714/38.1 |
| 2005/0144529 A1 * | 6/2005 | Gotz | .............. | G06F 11/3684 714/38.1 |
| 2005/0144595 A1 * | 6/2005 | McLean | .............. | G06F 9/45512 717/136 |

(Continued)

OTHER PUBLICATIONS

NPL—Bash-Guide—Creating and running a script—2014, published at http://tldp.org/LDP/Bash-Beginners-Guide/html/sect_02_01.html Captured in 2014.*

(Continued)

*Primary Examiner* — Wei Zhen
*Assistant Examiner* — Hossain Morshed
(74) *Attorney, Agent, or Firm* — Chamberlain, Hrdlicka

(57) ABSTRACT

In general, in one aspect, the technology relates to a method for composable testing. The method may include executing a story by, for at least one step in the story: identifying, from a plurality of generic compiled code interfaces, a code interface matching the step, identifying a user interface (UI) widget referenced in the step, issuing a call to testing script code, the call having a parameter of the UI widget, and executing the call using the testing script code. The method may further include generating a story report from executing the story, and storing the story report.

13 Claims, 9 Drawing Sheets

(56) References Cited

U.S. PATENT DOCUMENTS

| | | | | |
|---|---|---|---|---|
| 2008/0235633 | A1* | 9/2008 | Ghiloni | G06F 11/3676 715/862 |
| 2009/0158094 | A1* | 6/2009 | Evans | H04L 43/50 714/37 |
| 2009/0249297 | A1* | 10/2009 | Doshi | G06F 11/3672 717/124 |
| 2010/0138778 | A1* | 6/2010 | Dewan | G06F 9/4443 715/789 |
| 2011/0119652 | A1* | 5/2011 | Yu et al. | G06F 9/4428 717/108 |
| 2011/0126158 | A1* | 5/2011 | Fogarty | G06F 3/0481 715/835 |
| 2011/0246540 | A1* | 10/2011 | Salman | G06F 11/3672 707/812 |
| 2012/0246515 | A1* | 9/2012 | Lusenhop | G06F 11/3672 714/32 |
| 2012/0246611 | A1* | 9/2012 | Sawant | G06F 8/35 717/104 |
| 2013/0152047 | A1* | 6/2013 | Moorthi | G06F 11/368 717/124 |
| 2014/0068410 | A1* | 3/2014 | Dolinina | G06F 11/3684 715/234 |
| 2014/0196029 | A1* | 7/2014 | Kannan | G06F 9/45504 718/1 |
| 2014/0201701 | A1* | 7/2014 | Boden | G06F 8/10 717/100 |
| 2014/0201712 | A1* | 7/2014 | Boden | G06F 11/3684 717/124 |
| 2014/0201713 | A1* | 7/2014 | Boden | G06F 11/3692 717/124 |
| 2014/0229917 | A1* | 8/2014 | Chiantera | G06F 11/3684 717/124 |
| 2014/0279606 | A1* | 9/2014 | Storm | G06Q 30/0283 705/317 |
| 2014/0359581 | A1* | 12/2014 | Soshin | G06F 11/3692 717/126 |
| 2014/0366005 | A1* | 12/2014 | Kozhuharov | G06F 11/3696 717/125 |
| 2015/0100942 | A1* | 4/2015 | Misbhauddin | G06F 8/72 717/104 |
| 2015/0113331 | A1* | 4/2015 | Bhattacharya | G06F 11/3688 714/38.1 |
| 2016/0077832 | A1* | 3/2016 | Bhattacharyya | G06F 8/77 717/101 |

OTHER PUBLICATIONS

NPL—Book-Hunt-Progmatic Programmer—Addison Wesley—1999, Book Title: Progamatic Programming Author: Hunt et al. Publsihed by Addison Wesley, 1999.*

Bash-Guide, Creating and running a script, 2014, Published at http://tldp.org/LDP/Bash-Beginners-Guide/html/sect_02_01.html.*

EMC, "Getting Started with xCP 2.0", XCP2.0 Self-Paced Tutorial, Dec. 2012 (207 pages).

"EMC Documentum xCP Designer Help Version 2.0 User Guide", EMC Corporation, 2012 (325 pages).

"EMC Documentum xCelerated Composition Platform Designer Help", Version 2.1 User Guide, EMC Corporation, Corporate Headquarters, Hapkinton, MA, 2009-2014 (373 pages).

"EMC Documentum xCelerated Composition Platform:", Version 2.1 Developer Guide, EMC Corporation, Corporate Headquarters, Hopkinton, MA, 2009-2014 (82 pages).

"JBehave", Writing extual Stories, http://jbehave.org/reference/stable/developing-stories.html#writing, Version 4.0.1 published Jul. 6, 2015 (44 pages).

* cited by examiner

```
11
12 @High
13 xCP_Runtime_CreateInlineBO_03.story
14 xCP_Runtime_CreateMultiInlineBO_01.story
15 xCP_Runtime_CreateMultiInlineBO_03.story
16
17 @Medium
18 xCP_Runtime_CreateInlineBO_01.story
19 xCP_Runtime_CreateInlineBO_02.story
20 xCP_Runtime_CreateInlineBO_04.story
21 xCP_Runtime_CreateInlineBO_05.story
22 xCP_Runtime_CreateInlineBO_06.story
23
24 @Low
25 xCP_Runtime_CreateInlineVar_01.story
26
27
28 @Sanity
29 xCP_Runtime_CreateInlineBO_03.story
30 xCP_Runtime_CreateInlineBO_02.story
31 xCP_Runtime_CreateMultiInlineBO_02.story
```

802 Grouping A
804 Grouping B
806 Grouping C
808 Grouping D

*FIG. 8*

```
Scenario: xCP_ContextMenu_Action_On_FullText_Query
Given I am logged in with user id patty and password patty at: http://
10.31.83.129:8000/Auto22app1/signin.jsp
Then user with id patty is logged in When I navigate to page run_fulltext_report_sea
Then I am on page run_fulltext_report_sea
Then widget text_input is visible
When I click button button
Then result list results_list is loaded
                                              ⟵ 906
When I select row in result list results_list at index 0
And I open context menu on selected row in result list results_list
And I click on context menu item contextmenu_action9
Then I am on page run_home
```
⎫
⎬ 900
⎭

```
JAVA Code
    Annotation at Java Interface level
    @UseStepRunnerProxy(classIdentifier="resultlist")
    public interface ResultsListSteps extends IBrowserSteps {

Annotation at Java Interface step method level       ⟵ 908
910 ⟵  @When("I select row in result list $widgetId at index $index")
       @Conditions(beforeStep = @Condition(page=BOOLEAN.TRUE, widget =
@Widget(name=@Named("widgetId"), loaded=BOOLEAN.TRUE,
enabled=BOOLEAN.TRUE)),
                                                          ⟵ 912
                         afterStep = @Condition(widget =
@Widget(name=@Named("widgetId"), selection = BOOLEAN.TRUE)))
       public void selectRowByIndex(@Named("index")int index,
@Named("widgetId") String widgetId);     ⟵ 914
```
⎫
⎬ 902
⎭

```
JavaScript Code
    selectRowByIndex: function (index, widgetId, clearSelection) {
        var rlWidget = this.getWidget(widgetId);
        if(clearSelection == undefined || clearSelection ==
xcp.automation.core.MethodExecutionResult.TRUE)
            this.clearSelection(widgetId);
        if (rlWidget) {
            if(this.selectRow(rlWidget, index)== xcp.automation.core.MethodExecutionResult.TRUE)
                return xcp.automation.core.MethodExecutionResult.TRUE;
        }else {
            xcp.Logger.error("Cannot find the widget with widget id : "+widgetId);
            return xcp.automation.core.MethodExecutionResult.FAILED;
        }
        return xcp.automation.core.MethodExecutionResult.FALSE;
    },
```
⎫
⎬ 904
⎭

FIG. 9

ANNOTATED TEST INTERFACES

CROSS-REFERENCE TO RELATED APPLICATIONS

This application claims priority, under 35 U.S.C. §119(a), to Indian Patent Application No. 2216/CHE/2015, filed on Apr. 30, 2015, and entitled: "Annotated Interfaces and Properties."

BACKGROUND

The development and deployment of web applications is a multistage process. A developer obtains or generates requirements documents listing the requirements of the web application and generates a software design based on the requirements documents. The developer may then create the web application using the software design. After creating or during creation of the web application, the developer tests portions of the web application. Testing often involves executing the web application under differing conditions. During testing, testers may identify unexpected and erroneous results to occur. The tester reports the unexpected and erroneous results, which is then corrected by the developer, and the testing continues. Once the web application satisfies testing, the web application is deployed.

BRIEF DESCRIPTION OF DRAWINGS

FIGS. 8 and 9 show examples in accordance with one or more embodiments of the technology.

DETAILED DESCRIPTION

Figure 1:
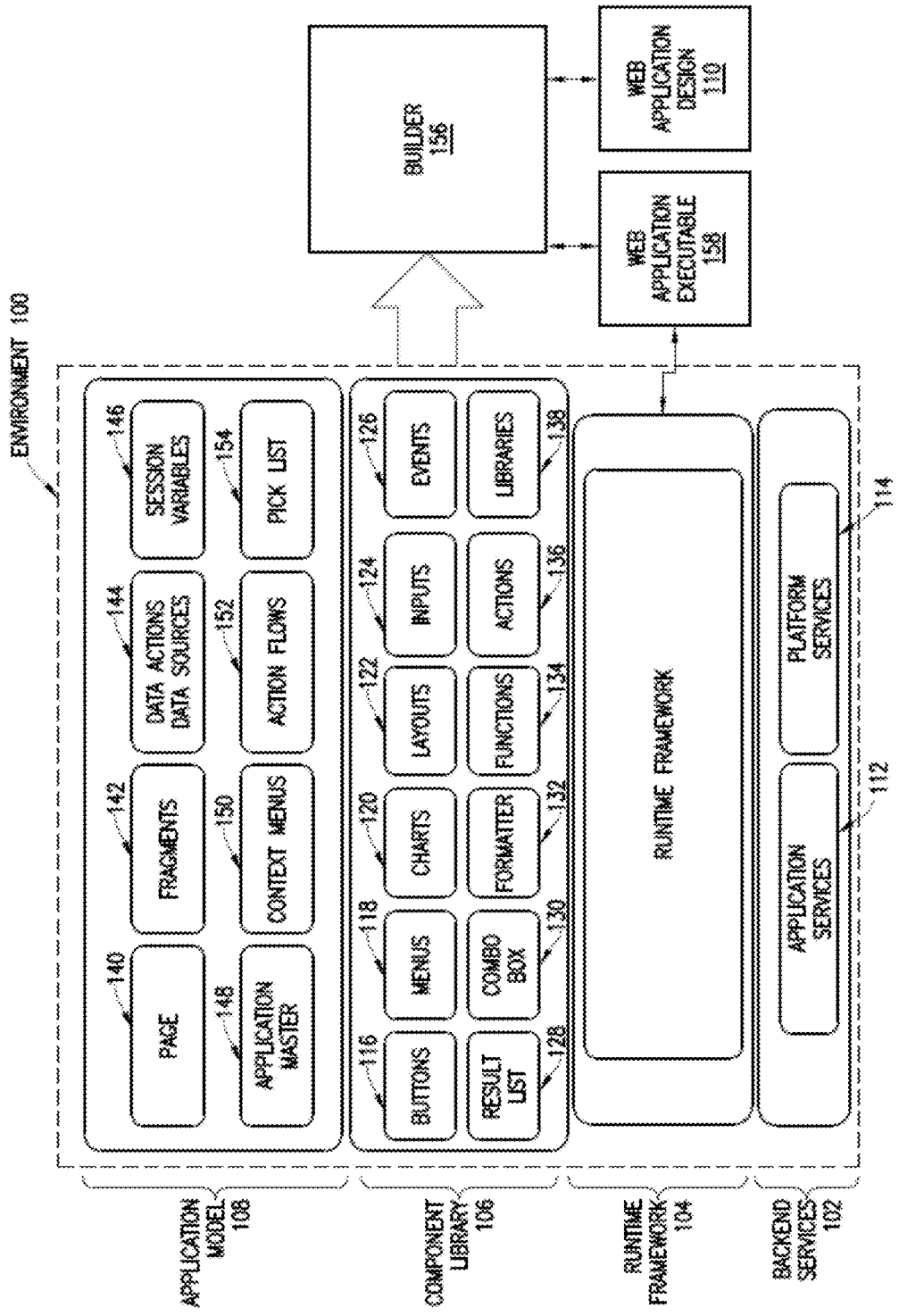
FIGS. 1, 2, 3 show schematic diagrams in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology toward behavior driven testing with automated selection of the interface corresponding to the portion of the application being tested. In particular, one or more embodiments are directed to a story based mechanism for testing a web application in a composable environment. Rather than manually entering data into fields to determine whether the expected results are received or creating script-based code to test a web application, testers write stories. Because a story may test different portions of the application or even the development environment, one or more embodiments are directed to categorizing steps in a story and executing those steps on the portion of the web application using the corresponding interface.

FIG. 1 shows a schematic diagram of a system in accordance with one or more embodiments of the technology. Specifically, FIG. 1 shows a schematic diagram of an environment (100) for developing and executing a web application that implements the context menu fragment management. In one or more embodiments of the technology, the environment (100) is an application designer. In particular, the application designer includes functionality to assist a user in composing a web application. Composing an application differs from developing an application in that, rather than writing code, a user drags and drops components and enters parameters into user interface fields. Because the environment (100) assists a user in composing an application, the environment may be referred to as a composable environment.

As shown in FIG. 1, the environment (100) includes backend services (102), a runtime framework (104), a component library (106), and an application model (108). Each of the aforementioned components is described below.

In one or more embodiments of the technology, backend services (102) are services that are not shown to the developer and ease the development of the web application design (110). The backend services (102) may include application services (112) and platform services (114). In one or more embodiments of the technology, the application services (112) allow a user interface based web application to be built on top of a generic model of a web application.

In one or more embodiments of the technology, the platform services (114) are services that manage the application for multiple different platforms. The multiple different platforms may have heterogeneous operating systems, devices, and/or display device sizes.

In one or more embodiments of the technology, the runtime framework (104) provides a runtime environment for a web application executable (158). Specifically, the runtime framework (104) manages the data and events of the executing web application executable (158).

In one or more embodiments of the technology, the component library (106) is a library of application components that a developer may add to the web application design (110). In other words, the developer may select components from the component library (106) to add functionality to the web application design (110). The component library (106) may include user interface (UI) components and processing components.

In one or more embodiments of the technology, UI widgets are components that are displayed to an end user. In other words, instances of the UI widgets are displayed on a display device. In one or more embodiments of the technology, the UI widgets may include, but are not limited to, buttons (116) (e.g., radio buttons, common buttons), menus (118) (e.g., drop down menu, check boxes), charts (120), layouts (122), inputs (e.g., fields) (124) and combo boxes (130). UI widgets in the component library may each be associated with a set of options. The set of options defines the execution of the UI widget. Namely, the set of options defines how a particular instance of the component is executed. Options associated with the UI widgets may include formatting, any text that is displayed, any action that is to be performed when the UI widget is selected, other options, and/or any combination thereof. The action may be to: perform an operation on the page, transition to a specific static page, evaluate an expression to determine the page for transitioning, update one or more instances of a business object type, and/or perform another operation.

In one or more embodiments of the technology, the expression may specify one or more data sources and operations to perform on the data from one or more data sources. A data source is a location of data that is not within the expression. For example, the data source may be another portion of the application page, a data repository, returned data for an instance of a business object type, or another data source. For example, another portion of the application page may be a text field, drop down menu option, or other option. Data from the data source is used to evaluate the operations in the expression. For example, the operation may include a conditional statement based on the data obtained. By way of another example, the operation may be to perform an end user submitted action specified in another field of the page. The result of evaluating an expression may be data for display on a webpage, a particular query to a data source, another result, or a combination thereof.

In one or more embodiments of the technology, the processing components are components that are hidden to the end user (i.e., are not displayed to the end user). For example, the processing components may include events (126), result lists (128), formatter (132), functions (134), actions (136), and libraries (138). Each of the processing components are discussed below.

Formatter (132) are instructions, which enable arranging of the data in specific formats in accordance with one or more embodiments of the technology. A formatter may be application to number, date time values, other values, or a combination thereof. In accordance with one or more embodiments of the technology, functions (134) are the re-usable piece of code, which takes a set of inputs and returns an output. Examples of functions include concat, substring, min, max, and other functions.

In accordance with one or more embodiments of the technology, an action (136) is a piece of reusable executable functionality that can be abstracted out of any particular component so that the action may be usefully shared among multiple pages and/or context menus. Example actions include update, delete, create, check-in, check-out, download, and other actions.

In accordance with one or more embodiments of the technology, a library (138) is a group of files, which constitute utility and infrastructure code. Example libraries include application startup code, action manager, type manager, utility, and logger. The processing components may also each be associated with a set of options that define how processing components are used.

In one or more embodiments of the technology, an application model (108) is a generic model for any web application. The application model includes pages (140), fragments (142), data actions and data sources (144), session variables (146), application master (148), context menus (150), action flows (152), a pick list (154), and a view data service. Each of these components of the application model is described below.

A page (140) in the application model (108) is a template for a webpage. In other words, a page in the application model (108) is a template for a complete and individual document that is displayable to the end user. In one or more embodiments of the technology, a page in the development environment is a generic template in that the page is generic to any business object type. The generic template may include instructions for defining a webpage of a particular type, such as, for example, a create webpage, an update webpage, a validate webpage, and a delete webpage. Such instructions may include, for example, an instruction to iterate through each attribute type of the business object type and generate a field or other UI widget for the attribute type and a label in a webpage.

An activity fragment (142) represents at least a portion of an activity. In other words, an activity is a defined sequence of actions that an end user may perform using the web application. An activity fragment is a portion of the defined sequence of actions. Data actions and data sources (144) define the storage structure and storage location of the data and the actions to perform on the data.

Session variables (146) are the variables stored for a particular session between the end user and the web application executable (158). For example, session variables (146) may include connection variables and information about the end user, such as the user's credentials (e.g., user identifier), role of the end user, and other information.

The application master (148) defines the global look and feel of the web application in accordance with one or more embodiments of the technology. For example, the application master (148) may include various banners, menu items, fonts, colors, and other features that are displayed and surround the individual pages. By way of another example, the application master (148) may include a template on which the pages (140) are based.

Context menus (150) are instances of menus that are dependent on the context in which the menu is selected. In other words, context menus are selected in a same or similar manner, but have options that are dependent on the context in which the context menu is displayed.

Action flows (152) are a sequence of actions that are performed. Action flows may or may not have user interaction. For example, an action flow may be completely automatic. By way of another example, an action flow may be a defined sequence of actions by which a user is guided using the web application.

In one or more embodiments of the technology, a pick list (154) is a list of displayed items from which a set of items (154) may be selected. In other words, more than one displayed item may be selected from a pick list.

The web application design (110) is a particular design of a web application created by a developer. Specifically, the web application design (110) includes instances of the components of the application model (108) and component library (106), may execute on the runtime framework (104), and may use the backend services (102).

The web application design (110) is connected to a builder (156) in accordance with one or more embodiments of the technology. The builder (156) provides a UI for a developer to create the web application design (110). In some embodiments, the developer does not need to know programming languages or other development knowledge to build the web application design. Rather, the builder (156) provides an interface by which the developer can primarily drag and drop components into a web application design (110), and enter parameters into fields to create the web application design (110). Thus, in some embodiments, a developer may be a business analyst rather than have any training in application development using a programming language.

The UI of the builder (156) may include editor features and sub-systems. The editor features may include editors for modifying various aspects or views of the web application design, and/or a builder UI to assist in the development of the web application design in accordance with one or more embodiments of the technology. For example, the editors may include business object types, documents, cases, searches, reports, pages, roles, apps, widgets, and process editors. The builder UI may include a new artifact wizard, add-on top-level menu, add-on tool bar buttons, context menus, an artifacts properties page, and a model editor.

The builder (156) also includes functionality to create the web application executable (158) from the web application design (110). In other words, the builder constructs the instructions for the web application executable from the web application design that is created using a drag and drop framework in accordance with one or more embodiments of the technology. The builder (156) may include components and functionality to perform artifact management, validate the web application, generate code, and package and deploy the web application. The builder (156) may also include components functionality to perform source control and project/library management.

Figure 2:
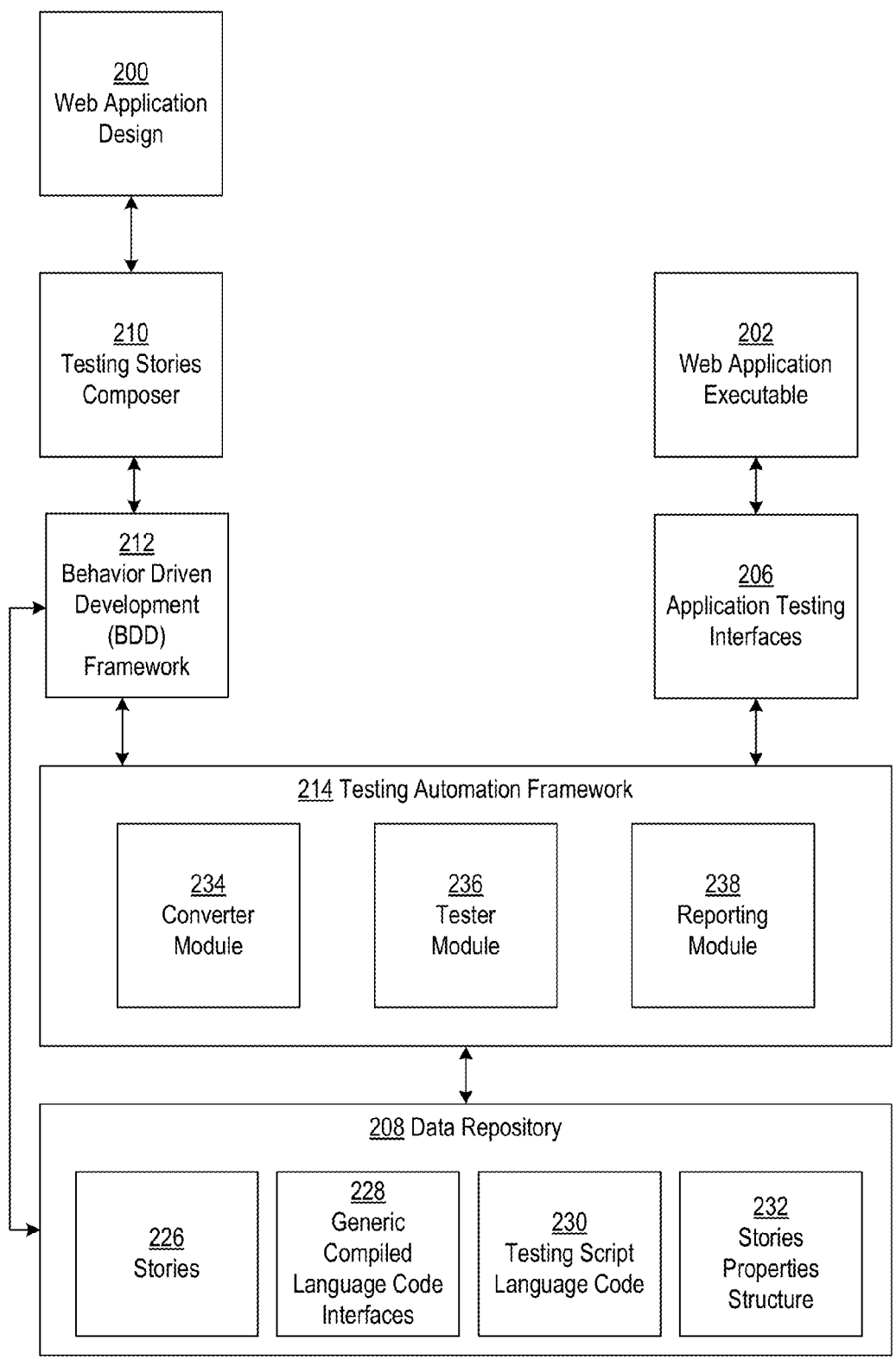

Once a web application is composed, a system may be used to test the web application. FIG. 2 shows a system in accordance with one or more embodiments of the technology. As shown in FIG. 2, the second environment may include the web application design (200), web application executable (202), data repository (208), testing stories composer (210), behavior driven development framework (212), application testing interfaces (206), and testing automation framework (214). Each of these components is described below.

In one or more embodiments of the technology, the web application design (200) corresponds to the web application design (110) discussed above with reference to FIG. 1. The web application executable (202) in FIG. 2 corresponds to the web application executable (158) in FIG. 1.

In one or more embodiments of the technology, the application testing interfaces (206) correspond to interfaces for testing at least a portion of the web application executable (202). In particular, each interface includes functionality to interact with a particular portion of the web application executable (202).

For example, a web interface is software code that may include functionality to interact with the user interface of the web application. In particular, the web interface may include functionality to insert data and select user interface widgets into the web browser in a similar manner to a human interacting with the web browser. Thus, the web interface may test the browser code. In one or more embodiments of the technology, the web interface is a web plug-in. In other words, the web interface may be a plug-in to the web browser that is configured to receive commands.

By way of another example, a data services interface is software code that includes functionality to interact with the backend portion of the web application. In one or more embodiments, the data services interface bypasses the browser code when interacting with the backend. Rather, the data services interface includes functionality to use the application programming interface (API) of the backend in order to interact with the backend.

In one or more embodiments of the technology, the data repository (208) is any type of storage unit and/or device (e.g., a file system, database, collection of tables, or any other storage mechanism) for storing data. Further, the data repository (208) may include multiple different storage units and/or devices. The multiple different storage units and/or devices may or may not be of the same type or located at the same physical site. The data repository (208) includes functionality to store stories (226), generic compiled language code interfaces (228), testing script language code (230), and storage properties structure (232). Each of these are described below.

Stories (226) are scenarios written in sentence form that is capable of being read by a human regardless of application coding experience. Each story (226) describes a scenario and the resulting behavior of the application that should occur. In one or more embodiments of the technology, stories are written using keywords. The keywords may include "Given", "When", "And", and "Then", which each may denote a start of a clause in the story. "Given" keyword is used to specify a set of pre-existing conditions, such as being logged in as a certain type of user. "When" and "And" keywords may describe the scenario, including steps and attributes that are performed in the scenario. "Then" keyword may denote the expected result from performing the scenario.

In one or more embodiments of the technology, the story may reference a particular action to perform in the user interface. For example, for the document object model (DOM), the story may include steps to clear, click, type text, right click, and double click on a user interface widget in the DOM. The story may further include steps to publish a UI event, set a value in a session parameter, and perform some event on a UI widget, such as focus, blur, hide, and show.

The following is an example of a story.
1. Scenario: common person input fields
2. Meta:
3. @id common_person_input_fields
4. When I type text <first_name> in first_name
5. And I type text <last_name> in last_name
6. And I type text <address> in address
7. Story: Employe operations
8. @ storyId: employe operation
9.
10. Scenario: I want to create employe using story fragment
11. Meta:
12. @defaultCompany EMC Services
13. @scenariold create_employee
14. When I navigate to page auto_create_employee_or_
15. Then I am on page auto_create_employee_or_
16. When Set active container to create_employe_fragment
17. Then Active container is create_employe_fragment
18. When I type text <designation> in designation
19. And I type text <employee_id> in employee_id
20. And I type text #login_user# in company
21. When I click button button
22. Then I am on page auto_create_employee_or_

In the above example, lines 10-22 describe a scenario that includes various steps, where each step is a line in the story. Lines 15, 17, and 22 each describe the expected result that the story is testing. Namely, lines 15, 17, and 22 define the result being tested.

In one or more embodiments of the technology, generic compiled language code interfaces (228) may correspond to executable code written in a compiled language that, when executed, define how to perform the steps of the story. In one or more embodiments, the generic compiled language code interfaces (228) is generic in that the same interface may be used for multiple UI widgets. In other words, in contrast to code interfaces for behavior driven development (BDD)

interfaces which are specific to the particular UI widget and generic to the inputs to the particular UI widget, the generic compiled language code interfaces may be generic to all UI widgets of a particular type (e.g., button, checkbox, form field, etc.). In some embodiments, the generic compiled language code interface is generic to all interfaces regardless of type. Further, in one or more embodiments of the technology, a generic compiled language code interface may include functionality to check for conditions, and pass parameters. In one or more embodiments of the technology, the conditions may include preconditions, which are conditions to be tested before executing the step. In one or more embodiments of the technology, the conditions may include post-conditions, which are conditions to test after execution of the step. In one or more embodiments of the technology, the generic compiled language code interface includes functionality to pass parameters to the testing script language code. In one or more embodiments of the technology, the parameters include a UI widget identifier, action flow information, and other information from the story.

In one or more embodiments of the technology, the generic compiled language interface includes an extended set of code annotations to denote conditions and identify parameters. In particular, the annotations may include clear before/after step conditions, page ready, widget state and property values of the UI widget, action flow lifecycle, execute DOM operation (e.g., click, type text, send key, submit), and logical name of a class.

Although not shown in FIG. 2, specific compiled language code interfaces may also exist without departing from the scope of the technology. For example, compiled language code for backend testing may also exist.

Continuing with FIG. 2, the testing script language code (230) includes the particular code for executing steps in one or more stories. In one or more embodiments of the technology, the testing script language code (230) is written in a scripting language. Although not as functional, the scripting language may take less skill of a developer to develop than a compiled language. Further, the testing script language code (230) may include the generic interfaces that take particular parameters. In other words, the methods in the testing script language code may be generic, but may take as arguments the particular parameters passed by the generic compiled language code interface.

Figure 3:
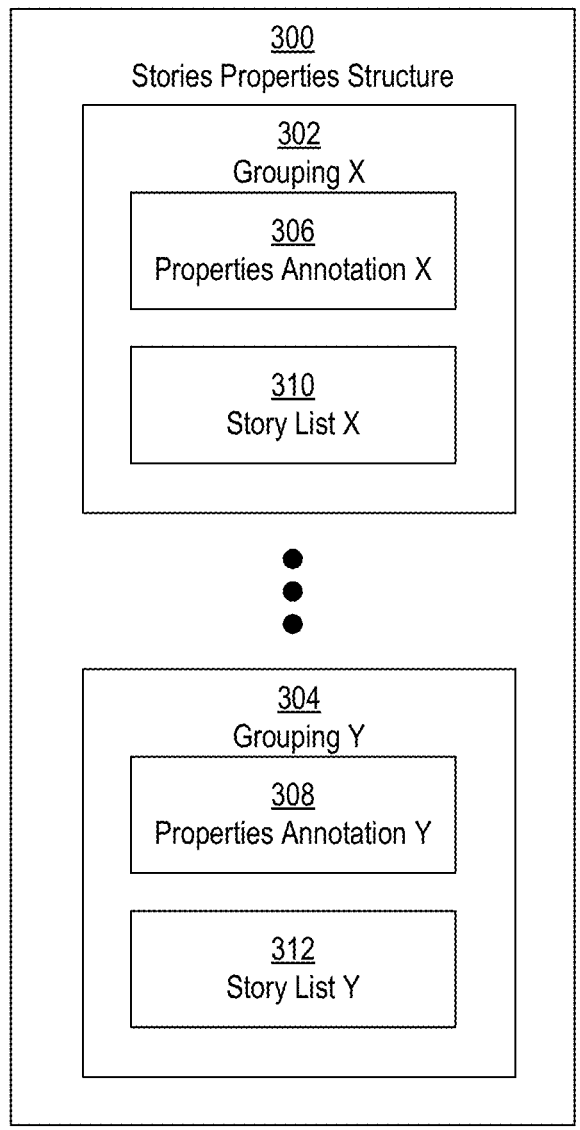

Continuing with FIG. 1, in one or more embodiments of the technology, the stories properties structure (232) is a structure for grouping and organizing stories. In one or more embodiments of the technology, the stories properties structure is a file. Other techniques for maintaining the stories property structure may be used without departing from the scope of the technology. FIG. 3 shows an example stories properties structure (300) in accordance with one or more embodiments of the technology. As shown in FIG. 3, the stories properties structure includes groupings (e.g., grouping x (302), grouping y (304)). Each grouping is a collection of one or more stories that have the same attributes. For example, the stories may test the same portion of the web application, test a particular set of input, or have another commonality. In one or more embodiments of the technology, the same story may be in multiple groupings. Each grouping may include a properties annotation (e.g., properties annotation x (306), properties annotation y (308)) and a story list (e.g., story list x (310), story list y (312)). The story list is the list of unique identifiers of stories in a grouping. For example, the story list may be an alphanumeric identifier, a file name, or another identifier. The properties annotation is an annotation describing the grouping. In one or more embodiments of the technology, the properties annotation may be user defined and may include one or more keywords for the grouping. One or more embodiments support bounded annotations that have a starting annotation and an ending annotation (e.g., "@start:task" . . . "@end: task"). Additionally, the properties annotation may include specialty actions that test specific actions (e.g., @create, @taskaction).

Returning to FIG. 2, the testing stories composer (210) corresponds to a user interface for assisting a user in creating a story. For example, the testing stories composer (210) may be a word processing application, a test development application, or any other application.

In one or more embodiments of the technology, the behavior driven development (BDD) framework includes functionality to iterate through a story, obtain the corresponding interface, and issue a call using the code interface in accordance with one or more embodiments of the technology. In one or more embodiments, the BDD framework may be implemented using a third party framework and a dynamic proxy to interpret the generic code annotations. An example of such a third party framework is JBehave developed by jbehave.org.

Continuing with FIG. 2, a testing automation framework (214) is interposed between the BDD framework (212) and the application testing interfaces (206). The testing automation framework (214) corresponds to hardware, software, firmware, or any combination thereof that includes functionality to execute the stories (226). In one or more embodiments of the technology, the testing automation framework (214) includes a converter module (234), a tester module (236), and a reporting module (238). The converter module (234) includes functionality to receive a call from the BDD framework (212) and convert the call to a set of one or more commands. The tester module (236) includes functionality to issue a call including one or more commands to the application testing interface (206). The reporting module (238) includes functionality to receive output from the test, transmit the output, and generate one or more reports based on the output. For example, the reports may be story reports that describe the results of executing a particular story. By way of another example, the output may be a testing report that describes the overall results of executing multiple stories.

While FIGS. 1, 2, and 3 show a configuration of components, other configurations may be used without departing from the scope of the technology. For example, various components may be combined to create a single component. As another example, the functionality performed by a single component may be performed by two or more components.

FIGS. 4-7 show flowcharts in accordance with one or more embodiments of the technology. The flowcharts shown in FIGS. 4-7 may be performed using the systems described above with reference to FIGS. 1, 2, and 3. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

Figure 4:
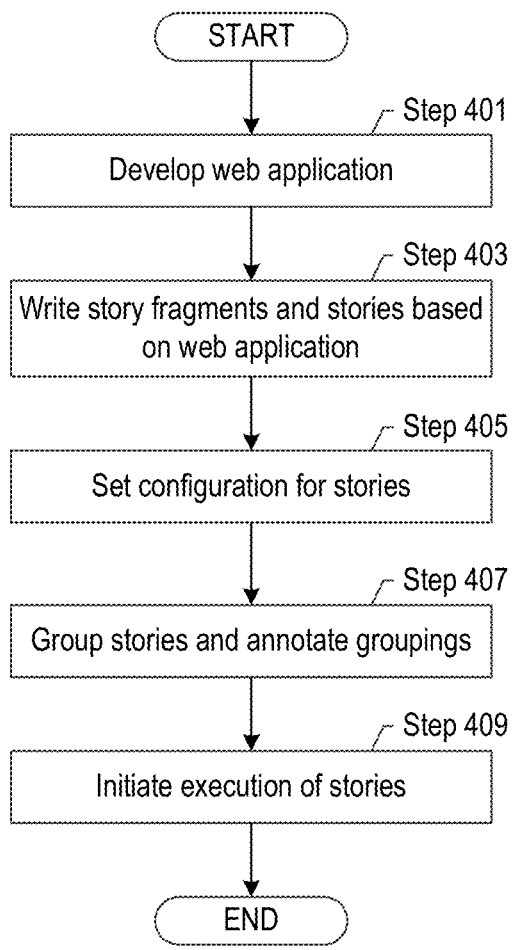
FIGS. 4, 5, 6, and 7 show flowcharts in accordance with one or more embodiments of the technology.

FIG. 4 shows a flowchart for one or more users to develop and test a web application in accordance with one or more embodiments of the technology. In Step 401, the user develops the web application. In particular, the development environment shown in FIG. 1 facilitates an expression-based development of a web application. Thus, using the developer tools offered by the development environment, a user might drag and drop components into a web application design to define various components of the web application design. Some of the components may have predefined templates and logic. In such a scenario, once dragged into the web application design, the user may submit values of various parameters of the components. For example, the user may submit a unique identifier, any references, or any other information.

In Step 403, stories are written based on the web application in accordance with one or more embodiments of the technology. Based on the web application, one or more users may identify features that the users wish to test. If a feature is to be tested, the users may write one or more stories that involve the use of the feature in different manners. The story describes the behavior of the system in response to a particular scenario.

In one or more embodiments of the technology, in Step 405, the user sets configurations for the stories. For example, a test developer may define generic compiled language code interfaces and test script language code for steps in the stories.

In Step 407, stories are grouped and the groupings are annotated in accordance with one or more embodiments of the technology. In particular, for each story, a developer may specify a grouping for the story in the stories properties structure. By organizing stories into the properties file, stories are categorized and may be filtered based on specific attributes. Further, because stories may be in multiple different properties structure, embodiments allow for the stories to be executed during each set of test run that is applicable to the story.

In Step 409, execution of the stories is initiated in accordance with one or more embodiments of the technology. In one or more embodiments, initiating execution of the stories include selecting one or more stories for execution and requesting that the BDD framework start execution. In one or more embodiments of the technology, selecting more than one story may include selecting an annotation and requesting all stories execute that have the particular annotation.

Figure 5:
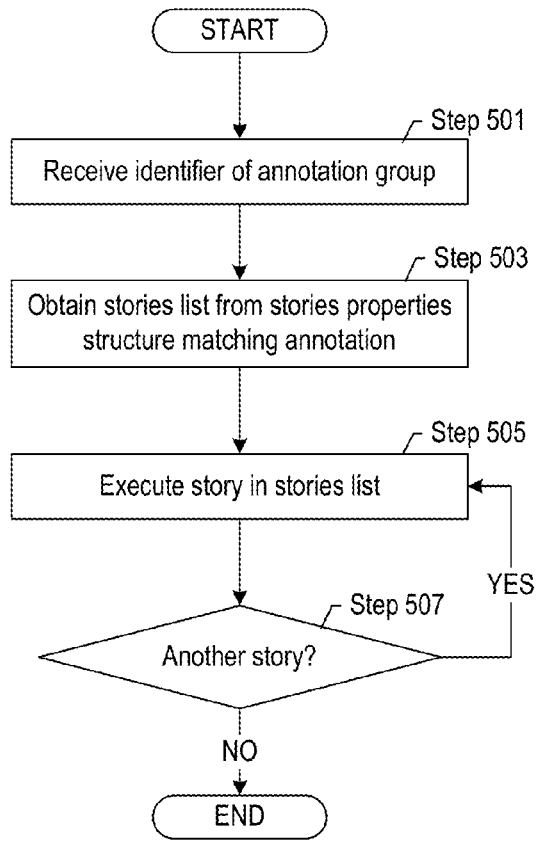

FIG. 5 shows a flowchart for a BDD framework to execute stories in accordance with one or more embodiments of the technology. In one or more embodiments of the technology, the BDD framework receives stories. The BDD framework may receive the stories directly or indirectly. For example, the BDD framework may receive stories directly by a user composing the stories using a user interface of the BDD framework. The BDD framework may receive stories indirectly, such as by a user providing an identifier of a folder that includes stories.

In Step 501, the BDD framework receives an identifier of an annotation group in accordance with one or more embodiments of the technology. As discussed above, the user, using the user interface of the BDD framework, provides the properties annotation or a keyword that may match the properties annotation.

In Step 503, the BDD framework obtains stories from the stories properties structure that match the annotation in accordance with one or more embodiments of the technology. In one or more embodiments of the technology, the BDD framework queries the stories property structure to identify the grouping that includes a properties annotation matching the requested property.

In Step 505, a story in the stories list is executed in accordance with one or more embodiments of the technology. In particular, the BDD framework may select a story from the stories list. The BDD framework obtains each step of the story in succession and executes the step. Executing a step of the story is discussed below and in reference to FIG. 6.

Continuing with FIG. 5, a determination is made whether another story in the stories lists exists. If another story exists, the flow may proceed with Step 505 for the next story. If another story does not exist, the flow may proceed to end.

Figure 6:
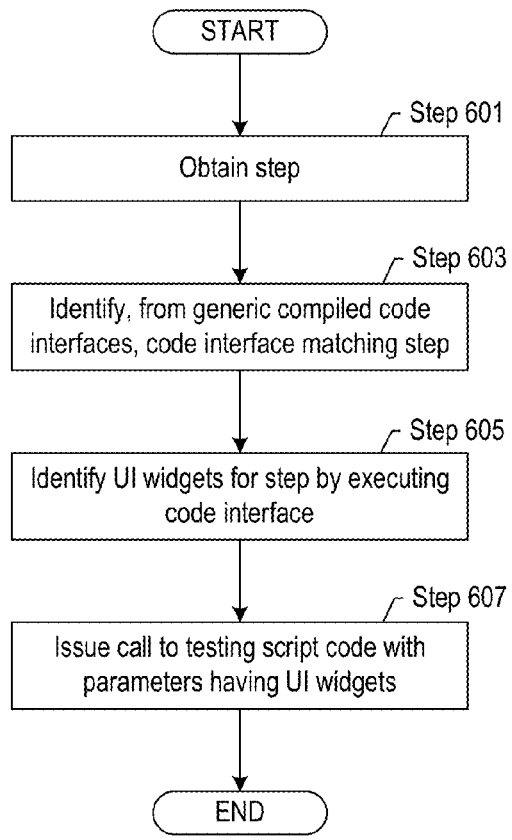

Turning to FIG. 6, FIG. 6 shows a flowchart for the BDD framework to execute a step in a story in accordance with one or more embodiments of the technology. In Step 601, a step is obtained. As discussed above, the BDD framework iterates through each step in succession. Thus, the obtained step is the first unprocessed step in accordance with one or more embodiments of the technology. In Step 603, the BDD framework identifies, from generic compiled code interfaces, the code interface matching the step. In particular, the BDD framework may parse the step and identify the code interface having the same clause as listed in the step. In some embodiments, the clause in the generic compiled code interface includes placeholders for variables, including parameters. The BDD framework uses the placeholder to extract data from the step.

In Step 605, one or more UI widgets for the step are identified by executing the code interface for the step. In one or more embodiments of the technology, the BDD framework executes the compiled code to obtain parameters for the call. A portion of the compiled code may designate the name of the widget using a code annotation, such as @widgetid or @named. The BDD framework identifies the widget identifier based on the annotation and performs additional processing using the widget identifier. In addition to the UI widgets, preconditions and post conditions for the step is identified and executed.

In Step 607, a call is issued to the testing script code with parameters having the UI widget. For each step in the story, the BDD identifies the code interface matching the step. The BDD framework issues a call to the method referred to in the code interface using parameters from the step. The call is routed to the testing automation framework in accordance with one or more embodiments of the technology.

Figure 7:
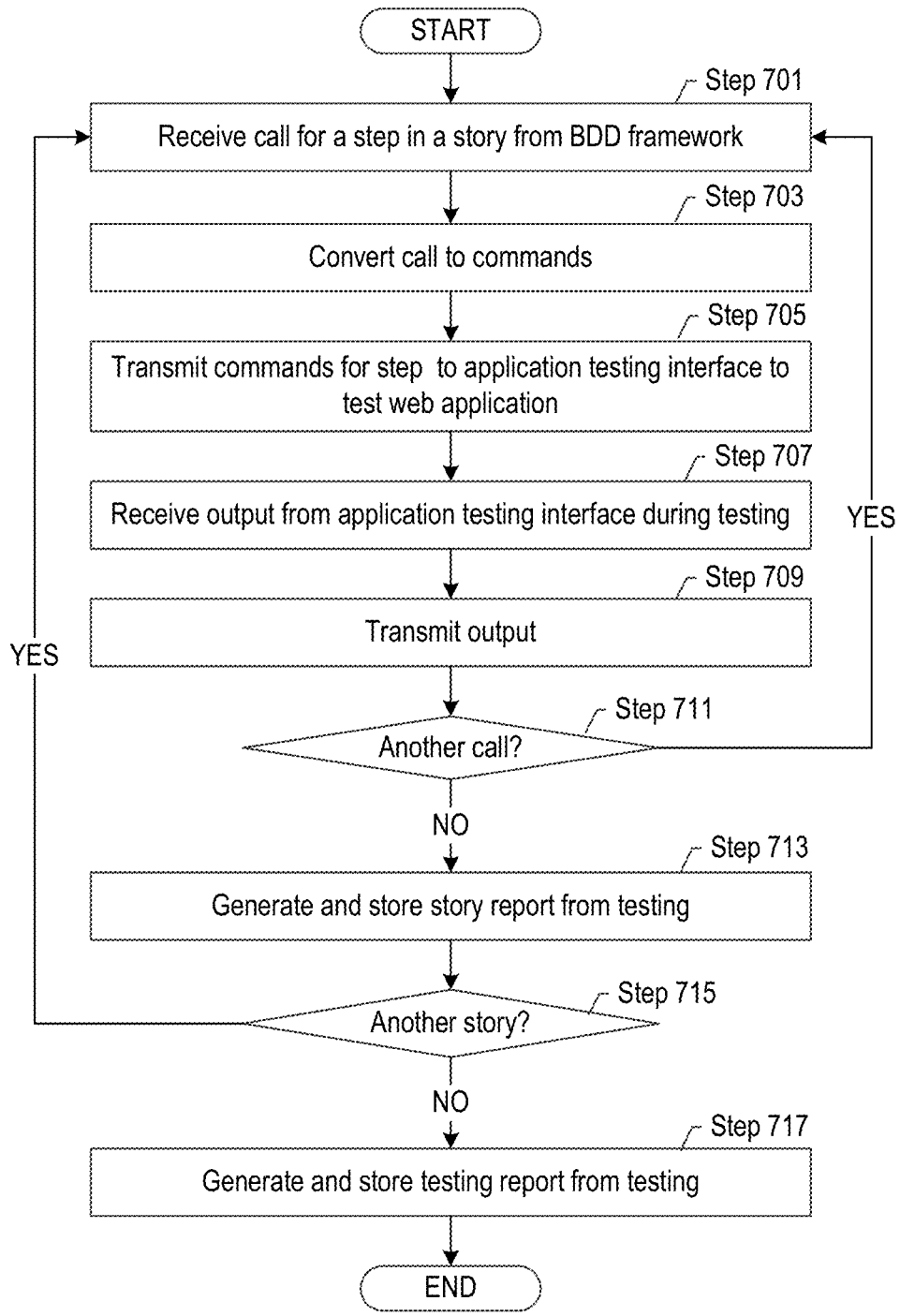

FIG. 7 shows a flowchart for performing operations by the testing automation framework in accordance with one or more embodiments of the technology. In Step 701, a call for a step in a story is received from the BDD framework in accordance with one or more embodiments of the technology. In one or more embodiments of the technology, the testing automation framework may receive a method call from the BDD framework. The method call includes an identifier of a method and parameters defined for the method.

In Step 703, the call is converted to commands in accordance with one or more embodiments of the technology. In one or more embodiments of the technology, the method call is associated with a set of commands. For example, the set of commands may be each of the commands in the test code for the call.

In Step 705, the commands for the step are transmitted to the application testing interface to test the web application in accordance with one or more embodiments of the technology. In one or more embodiments of the technology, the commands are transmitted, one at a time, to the application testing interface. The application testing interface interfaces with the corresponding portion of the web application executable or with the development environment to request performance of the operation in the commands. By way of an example, if the command is to enter an item of data in a field, the testing automation framework may submit a command to the web interface. Within the browser window, the web interface automatically enters the data item in the field. By way of another example, if the command is to perform an operation in the data services code, the testing automation framework sends the command via the data services interface to the data services code. In response, the data services code performs instruction in the command.

In Step 707, output from the application testing interface is received during testing in accordance with one or more embodiments of the technology. In the case of the browser code, the out may be visual output that is displayed, an automated message that an operation completed successfully, the expected result (e.g., display a certain page of the web application), or an error notice from the web application. In the case of the data services code, the output may be an automatic response that the command completed successfully or a failure in one or more embodiments of the technology. In some embodiments, output is not received without a subsequent command. For example, the data services portion of the application may update a portion of a database, and executing a subsequent command may be performed to determine whether the update was performed correctly. Additionally, the testing automation framework may further track the execution of the commands and generate output based on the tracking. For example, the testing automation framework may keep track of the length of time for the web application executable to complete the operation requested.

In Step 709, the output is transmitted in accordance with one or more embodiments of the technology. In one or more embodiments of the technology, during execution, the system may transmit output to a user interface. Thus, the user may view the output from executing the commands. In one or more embodiments of the technology, the system may transmit output to a log file.

In Step 711, a determination is made whether another call is received in accordance with one or more embodiments of the technology. In particular, a determination is made whether another call is received for the same story. Because each story may be a different scenario, the system may reset between stories. However, if a call is received for the same story, then the system continues under the current state of the web application executable or development environment. If another call is received, the flow may proceed to Step 701.

In Step 713, a story report from the testing is generated and stored in accordance with one or more embodiments of the technology. The story report may include information about the particular story, such as success or failure of execution (e.g., did results match). The story report may also include the tracking information gathered in Step 707. Generating the story report may be based on templates or predefined in code.

In Step 715, a determination is made whether another story is being tested in accordance with one or more embodiments of the technology. In particular, a determination is made whether the test is testing another story. If another story is being tested, then the flow may proceed to Step 701. Otherwise, the flow may proceed to Step 717.

In Step 717, a testing report from the testing is generated and stored in accordance with one or more embodiments of the technology. In one or more embodiments, the testing report lists the total number of stories that completed successfully, and failed. The testing report may further list types of failures and portions of the web application executable that had the failures. Generating the testing report may be performed using templates or predefined code.

FIG. 8 shows an example section of a stories properties file (800) in accordance with one or more embodiments of the technology. The following example is for explanatory purposes only and not intended to limit the scope of the technology. In the example in FIG. 8, the user has defined four groupings of stories (e.g., grouping A (802), grouping B (804), grouping C (806), and grouping D (808)). For the purposes of the example, consider the scenario in which the user wants to group stories based on the priority of the features tested by the stories. In other words, if the user has limited amounts of time to execute stories, the user may desire to execute the stories that test the higher priority features over stories that test low priority features. Thus, the user creates groupings based on priority levels of the features. As shown in the example, the user may further define property annotations that denote the priority level of the features tested by the stories in the grouping. For example, grouping A (802) has a property annotation of "@high" to denote the stories in the grouping A test high priority features. Grouping A (802) further includes story identifiers (lines 13-15 in the properties file) for three stories. Grouping B (804) has a property annotation of "@medium" to denote the stories in the grouping B test medium priority features. Grouping B (804) further includes story identifiers (lines 18-22 in the properties file) for five stories. Grouping C (806) has a property annotation of "@low" to denote the stories in the grouping C test low priority features. Grouping C (806) further includes a story identifier (lines 25 in the properties file) for one story.

Similarly, the user may define additional annotations. For example, the user may specify @ sanity as another annotation of Grouping D (808).

FIG. 9 shows an example of a story (900), a corresponding compiled language code interface (902), and testing script language code (904) in accordance with one or more embodiments of the technology. In particular, the corresponding compiled language code interface (902), and testing script language code (904) is for step (906) in the story.

As shown, Step 906 states "when I select row in result list results_list at index 0". The compiled language code interface (902) includes an input (908) that matches the Step 906, but with $widgetId as a parameter to extract. Further includes preconditions (910) and post conditions (912) for executing the Step. When the Step (906) is executed, the method defined by line (914) of the compiled language code interface (902) is executed. Testing script language code (906) shows the show that is executed in response to the call. As shown, the script language provides an easy way for the developer to test any widget when the parameters are passed. Further, changes to the code do not require vast changes to the tests as the compiled language code is reusable across multiple widgets.

Figure 10:
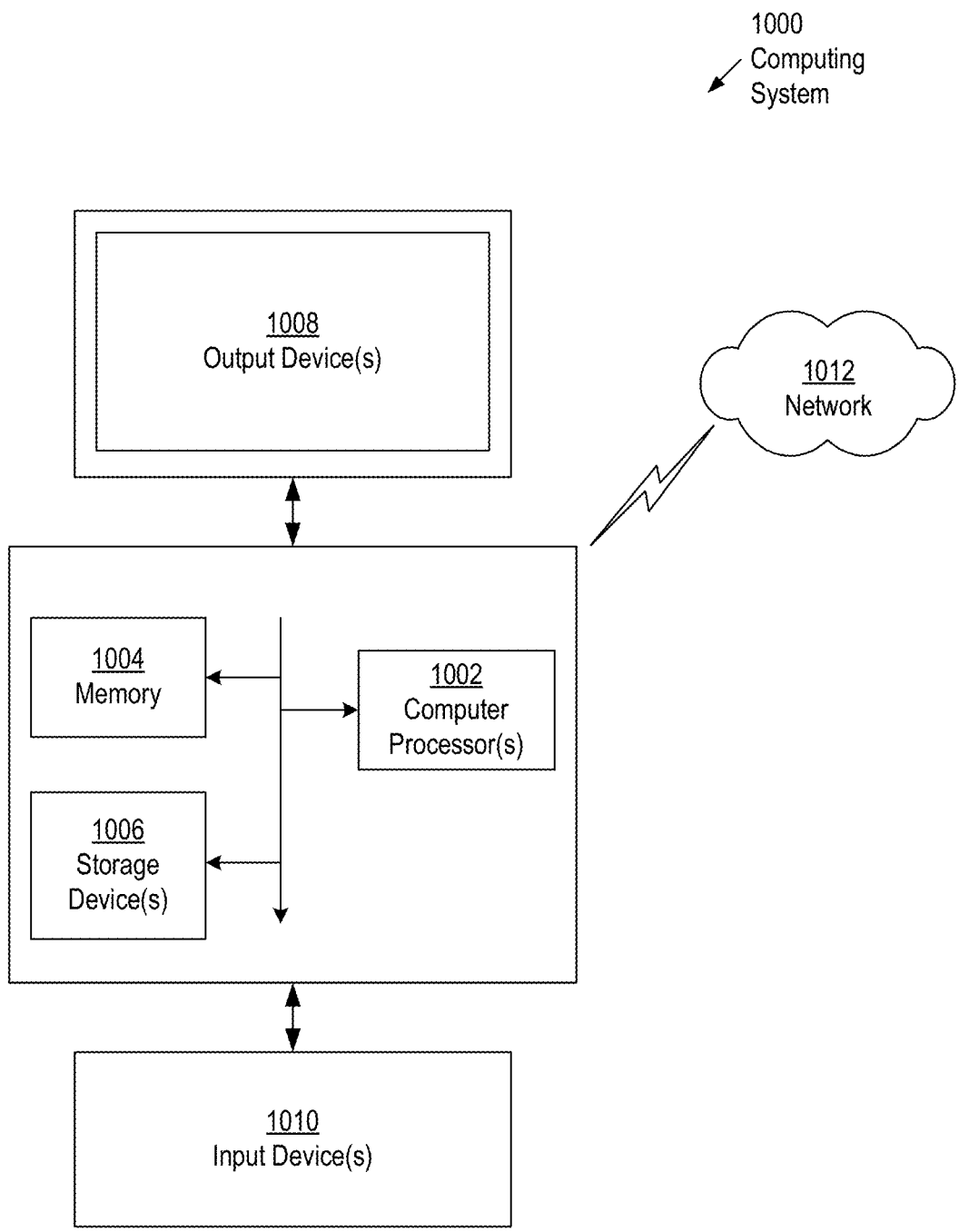
FIG. 10 shows a computing system in accordance with one or more embodiments of the technology.

Embodiments of the technology may be implemented on a computing system. Any combination of mobile, desktop, server, embedded, or other types of hardware may be used. In other words, various components of FIGS. 1-3 may be and/or may execute on a computing system, such as the computing system shown in FIG. 10. For example, as shown in FIG. 10, the computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) may be one or more cores, or micro-cores of a processor. The computing system (1000) may also include one or more input device(s) (1010), such as a touchscreen, keyboard, mouse, microphone, touchpad, electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1000) may be connected to a network (1012) (e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (1000) may be located at a remote location and connected to the other elements over a network (1012). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for composable testing, the method comprising:
  receiving a selection of a properties annotation;
  identifying a grouping comprising a plurality of stories matching the properties annotation, wherein the grouping is identified using bounded annotations;
  executing a story of the plurality of stories by, for at least one step in the story:
    identifying, from a plurality of generic compiled code interfaces, a code interface matching the step;
    identifying a user interface (UI) widget referenced in the step;
    issuing a call to testing script code, the can having a parameter of the UI widget; and executing the call using the testing script code, wherein the story is executed in response to the story being in the grouping;
  generating a story report from executing the story;
  and storing the story report.

2. The method of claim 1, wherein executing the call comprises:
  converting the call to a plurality of commands;
  transmitting the plurality of commands to an application testing interface;
  receiving output from the application testing interface based on executing the plurality of commands; and
  transmitting the output.

3. The method of claim 1, wherein the UI widget is identified based on a code annotation in the code interface.

4. The method of claim 1, wherein executing the story further comprises, for the at least one step:
  identifying, within the code interface, a condition; and
  executing, using the code interface, a test to determine whether the condition is satisfied,
  wherein the call is issued in response to determining that the condition is satisfied.

5. The method of claim 1, wherein executing the story further comprises, for the at least one step:
  identifying, within the code interface, a post condition;
  executing, using the code interface, a test to determine whether the post condition is satisfied; and
  reporting whether the post condition is satisfied.

6. A system comprising:
  a computer processor;
  a behavior driven development (BDD) framework that, when executed on the computer processor, is configured to:
  receive a selection of a properties annotation;
  identify a grouping comprising a plurality of stories matching the properties annotation, wherein the grouping is identified using bounded annotations:
  execute a story of the plurality of stories by, for at least one step in the story:
    identifying, from as plurality of generic compiled code interfaces, a code interface matching the step;
    identifying a user interface (UI) widget referenced in the step; and issuing a call to testing script code, the call having a parameter of the UI widget, wherein the story is executed in response to the story being in the grouping;
  and a testing automation framework that, when executed on the computer processor, is configured to:
  execute the call;
  generate a story report from executing the story;
  and store the story report.

7. The system of claim 6, wherein executing the story further comprises, for the at least one step:
  converting the call to a plurality of commands;
  transmitting the plurality of commands to an application testing interface;
  receiving output from the application testing interface based on executing the plurality of commands; and
  transmitting the output.

8. The system of claim 6, wherein executing the story further comprises, for the at least one step:
identifying, within the code interface, a condition; and
executing, using the code interface, a test to determine whether the condition is satisfied,
wherein the call is issued in response to determining that the condition is satisfied.

9. A non-transitory computer readable medium comprising computer readable program code for testing, the computer readable program code for:
receiving a selection of a properties annotation;
identifying a grouping comprising a plurality of stories matching the properties annotation, wherein the grouping is identified using bounded annotations;
executing a story of the plurality of stories by, for at least one step in the story:
identifying, from a plurality of generic compiled code interfaces, a code interface matching the step;
identifying a user interface (UI) widget referenced in the step;
issuing a call to testing script code, the call having a parameter of the UI widget;
and executing the call using the testing script code, wherein the story is executed in response to the story being in the grouping;
generating a story report from executing the story;
and storing the story report.

10. The non-transitory computer readable medium of claim 9, wherein executing the call comprises:
converting the call to a plurality of commands;
transmitting the plurality of commands to an application testing interface;
receiving output from the application testing interface based on executing the plurality of commands; and
transmitting the output.

11. The non-transitory computer readable medium of claim 9, wherein the UI widget is identified based on a code annotation in the code interface.

12. The non-transitory computer readable medium of claim 9, wherein executing the story further comprises, for the at least one step:
identifying, within the code interface, a condition; and
executing, using the code interface, a test to determine whether the condition is satisfied,
wherein the call is issued in response to determining that the condition is satisfied.

13. The non-transitory computer readable medium of claim 9, executing the story further comprises, for the at least one step:
identifying, within the code interface, a post condition;
executing, using the code interface, a test to determine whether the post condition is satisfied; and
reporting whether the post condition is satisfied.

* * * * *